US011991495B2

(12) United States Patent
Staerke et al.

(10) Patent No.: US 11,991,495 B2
(45) Date of Patent: May 21, 2024

(54) MODULAR EARPIECE ADAPTOR

(71) Applicant: Adapto Global ApS, Copenhagen V. (DK)

(72) Inventors: Mads Staerke, Solrod Strand (DK); Jesper Martini, Frederiksberg (DK)

(73) Assignee: ADAPTO GLOBAL APS, Copenhagen V. (DK)

( * ) Notice: Subject to any disclaimer, the term of this patent is extended or adjusted under 35 U.S.C. 154(b) by 16 days.

(21) Appl. No.: 17/036,041

(22) Filed: Sep. 29, 2020

(65) Prior Publication Data

US 2022/0103928 A1 Mar. 31, 2022

(51) Int. Cl.
*H04R 1/10* (2006.01)

(52) U.S. Cl.
CPC ......... *H04R 1/1066* (2013.01); *H04R 1/1016* (2013.01)

(58) Field of Classification Search
CPC .... H04R 1/1066; H04R 1/1016; H04R 1/105; H04R 1/021; H04R 25/656; H04R 2420/07; H04R 25/659; A61F 11/08; A61F 11/12; A61F 11/085
See application file for complete search history.

(56) References Cited

U.S. PATENT DOCUMENTS 7,110,562 B1 * 9/2006 Feeley ................ H04R 25/607 381/328
7,401,679 B2 * 7/2008 Ipsen .................... H04R 25/60 381/328
8,340,338 B2 * 12/2012 Mlodzikowski ..... H04R 1/1016 381/328
9,628,889 B2 * 4/2017 Kirkpatrick .......... H04R 1/1016
2004/0010181 A1 * 1/2004 Feeley ................... H04R 25/60 381/322
2007/0125590 A1 * 6/2007 Oberdanner ............ A61F 11/08 181/135
2013/0259286 A1 * 10/2013 Chung ................ H04R 1/1016 381/380
2018/0213315 A1 * 7/2018 Kirkpatrick ............ A61F 11/08
(Continued)

FOREIGN PATENT DOCUMENTS

EP 1795160 A1 * 6/2007 .............. A61F 11/08
GB 2504303 A * 1/2014 .............. A61F 11/08
KR 10-2017-0003072 A 1/2017
(Continued)

OTHER PUBLICATIONS

International Search Report and Provisional Opinion in the Search Result in the related Application Serial No. PCTIB2021/00651 dated Feb. 4, 2022.
(Continued)

*Primary Examiner* — Angelica M McKinney
(74) *Attorney, Agent, or Firm* — Heath M. Sargeant; Charles A. Weiss; Holland & Knight LLP

(57) ABSTRACT

A modular earpiece adaptor may include an earpiece adaptor body having an upper surface and a lower surface, and one or more apertures within the earpiece adaptor body extending from the upper surface to the lower surface. The one or more apertures may be configured to removably couple one or more earpiece inserts to the earpiece adaptor body. The earpiece adaptor body is configured to be removably couplable to an earpiece housing.

13 Claims, 10 Drawing Sheets

(56) References Cited

U.S. PATENT DOCUMENTS

| | | | | |
|---|---|---|---|---|
| 2023/0034479 | A1 * | 2/2023 | Leuthold | H04R 25/656 |

FOREIGN PATENT DOCUMENTS

| | | | | | |
|---|---|---|---|---|---|
| KR | 10-1827386 | B1 | | 2/2018 | |
| KR | 101885853 | B1 | * | 8/2018 | |
| KR | 102324202 | B1 | * | 11/2021 | B29C 39/10 |
| WO | 2022069935 | A1 | | 4/2022 | |

OTHER PUBLICATIONS

International Search Report and Written Opinion issued in Application No. PCT/IB2021/000651 dated Mar. 24, 2022.

* cited by examiner

MODULAR EARPIECE ADAPTOR

TECHNICAL FIELD

The present disclosure generally relates to earpieces and, more particularly, to modular earpiece adaptors.

BACKGROUND

Earpieces are useful for hearing protection and communication. For example, earpieces may be used to suppress certain sounds, audible frequency bands, or audible frequency functions; enhance certain sounds, audible frequency bands, or audible frequency functions; enable communication with electronic devices, etc.

Standard or universal earpiece housings may be uncomfortable or distracting to users given the unique form of each user's ears. Custom earpiece housings may resolve these issues. However, the ability for a user to begin using certain earpiece functions (i.e., inserts for hearing protection, communication, etc.) is limited by the production and availability of custom earpieces as the user must wait for the custom earpiece housing to be completed before use. Even in situations where certain earpiece inserts (e.g., communication or filter inserts of an earpiece) may be used between a standard earpiece housing and a custom earpiece housing, each earpiece insert must be manufactured with a predefined geometry specific to the earpiece housing.

SUMMARY

In an embodiment, a modular earpiece adaptor may include an earpiece adaptor body having an upper surface and a lower surface, and one or more apertures within the earpiece adaptor body extending from the upper surface to the lower surface.

One or more of the following features may be included. The one or more apertures may be configured to removably couple one or more earpiece inserts to the earpiece adaptor body. At least one aperture of the one or more apertures may be configured to removably couple one or more of a communication insert and an audio insert to the earpiece adaptor body. At least one aperture of the one or more apertures may be configured to removably couple a filter insert to the earpiece adaptor body. The earpiece adaptor body may include a handle positioned on the upper surface of the earpiece adaptor body. The earpiece adaptor body may include a groove extending at least partially around the exterior of the earpiece adaptor body. The earpiece adaptor body may be configured to be removably couplable to an earpiece housing. The earpiece adaptor body may be configured to be removably couplable to the earpiece housing via the groove extending at least partially around the exterior of the earpiece adaptor body mating with a protruding lip extending at least partially around an interior rim of the earpiece housing. The earpiece adaptor body may be configured to be interchangeably couplable to a universal earpiece housing and a custom earpiece housing.

According to another embodiment, a modular earpiece adaptor may include an earpiece adaptor body configured to removably couple one or more earpiece inserts to the earpiece adaptor body. The earpiece adaptor body may be configured to be removably couplable to an earpiece housing.

One or more of the following features may be included. Earpiece adaptor body may be configured to be interchangeably couplable to a universal earpiece housing and a custom earpiece housing.

According to yet another embodiment, modular earpiece may include an earpiece housing and a modular earpiece adaptor configured to be interchangeably couplable to a universal earpiece housing and a custom earpiece housing.

One or more of the following features may be included. The modular earpiece adaptor may include an earpiece adaptor body having an upper surface and a lower surface, and one or more apertures within the earpiece adaptor body extending from the upper surface to the lower surface. The one or more apertures may be configured to removably couple one or more earpiece inserts to the earpiece adaptor body. The earpiece adaptor body may include a handle positioned on the upper surface of the earpiece adaptor body. The modular earpiece adaptor may include a groove extending at least partially around the exterior of the earpiece adaptor body. The earpiece housing may include a protruding lip extending at least partially around an interior rim of the earpiece housing. The modular earpiece adaptor may be configured to be removably couplable to the earpiece housing via the groove extending at least partially around the exterior of the earpiece adaptor body mating with a protruding lip extending at least partially around an interior rim of the earpiece housing. The earpiece housing may be one of a universal earpiece housing and a custom earpiece housing. The modular earpiece adaptor may be configured to be interchangeably couplable to the universal earpiece housing and the custom earpiece housing.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

Figure 1:
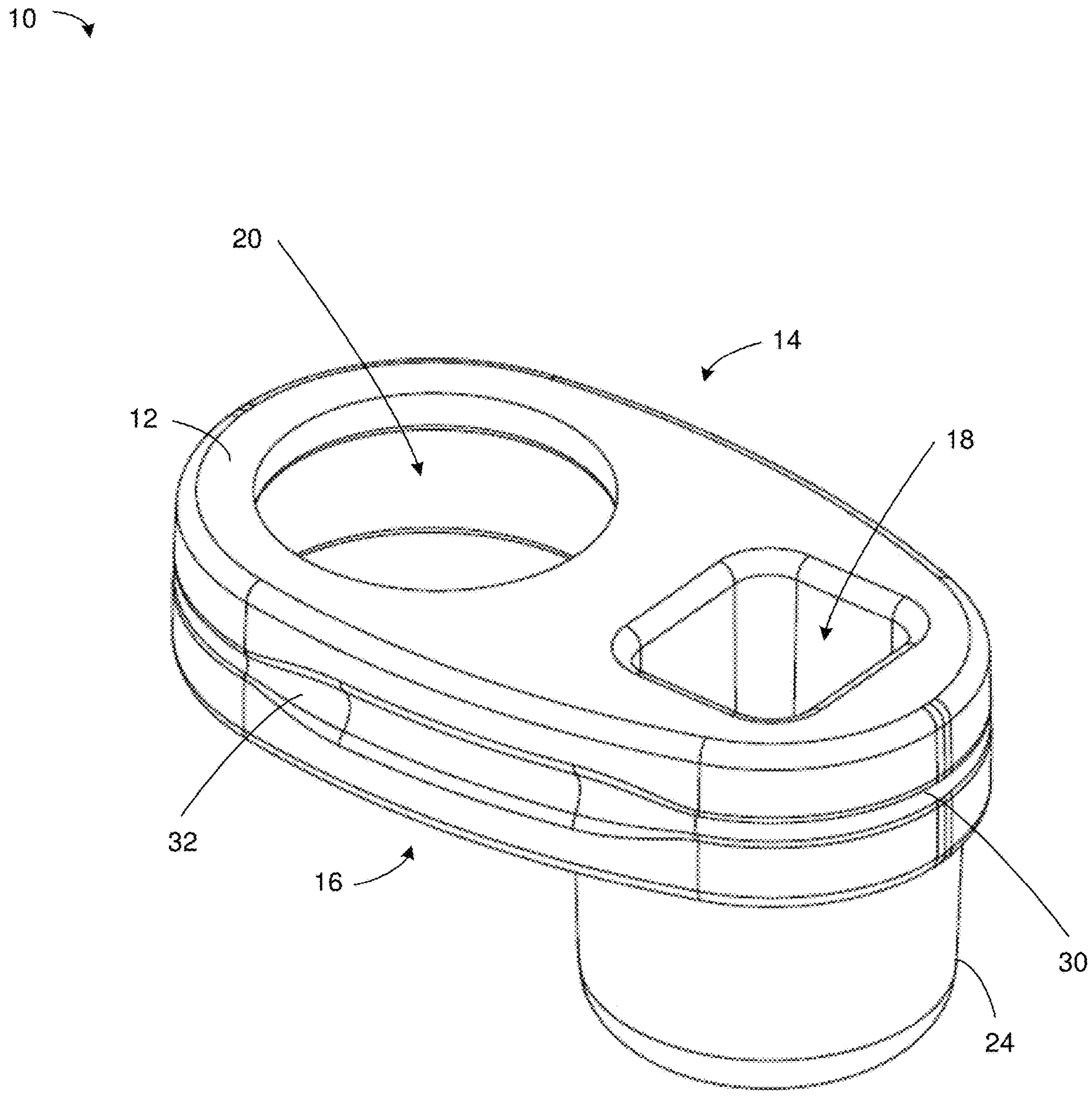
FIG. 1 is a perspective view of a modular earpiece adaptor, according to an example embodiment.
Figure 2:
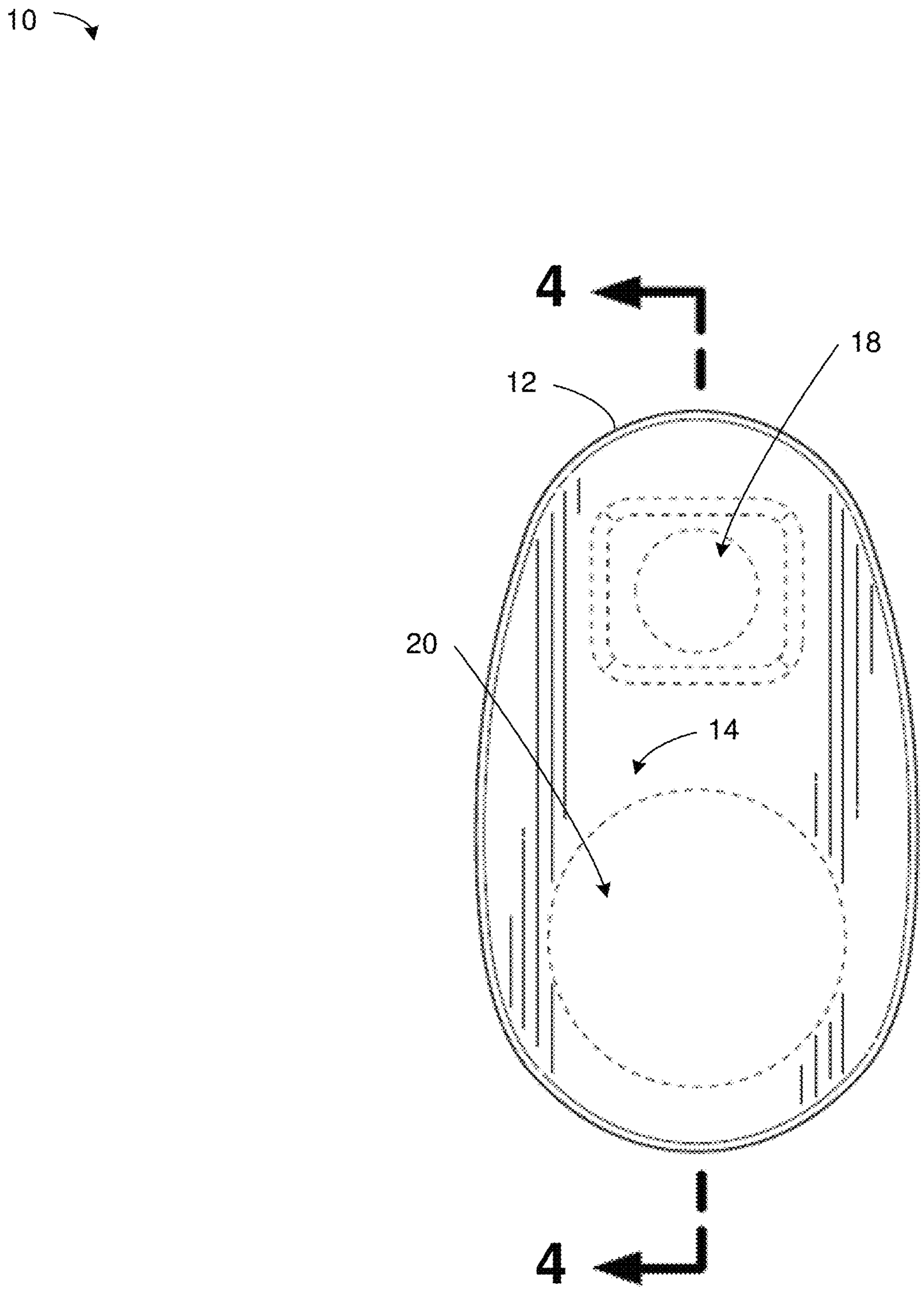
FIG. 2 is a top view of a modular earpiece adaptor, according to an example embodiment.
Figure 3:
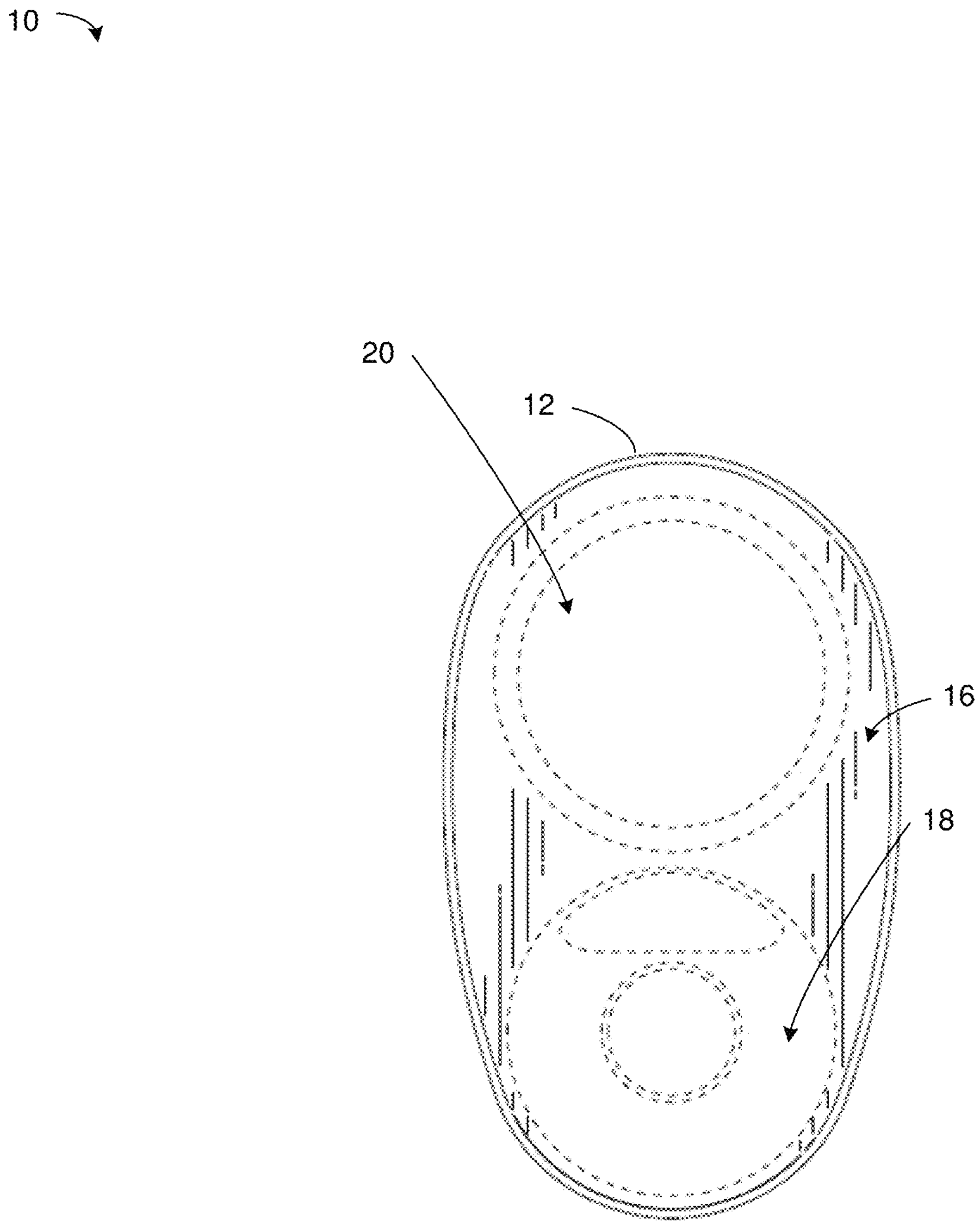
FIG. 3 is a bottom view of a modular earpiece adaptor, according to an example embodiment.

In general, consistent with the present disclosure, a modular earpiece adaptor is provided for allowing earpieces to function with various earpiece inserts in a modular fashion. For example, and referring generally to FIGS. 1-10, in some implementations, earpieces may generally include an earpiece housing and an earpiece insert (e.g., a communication insert, a filter insert, etc.). However, these earpiece inserts may be built into or integral with an earpiece housing or may be specially designed for a particular earpiece housing geometry associated with a specific earpiece. As will be described in greater detail below, a modular earpiece adaptor may include, but is not limited to, an earpiece adaptor body having an upper surface and a lower surface and one or more apertures within the earpiece adaptor body extending from the upper surface to the lower surface. Embodiments of the present disclosure may allow for various earpiece inserts or modules (i.e., communication inserts, filter inserts, etc.) to be adaptively used within standard earpiece housings and custom earpiece housings without requiring the earpiece inserts to conform to a geometry associated with the specific earpiece housing. In this manner and consistent with the present disclosure, earpieces may be modular such that earpiece inserts may be used in their original form while adapting to various unique geometries associated with earpiece housings utilizing a modular earpiece adaptor.

Referring to FIGS. 1-6 and in some implementations, a modular earpiece adaptor (e.g., modular earpiece adaptor 10) may include an earpiece adaptor body having an upper surface and a lower surface and one or more apertures within the earpiece adaptor body extending from the upper surface to the lower surface. An earpiece adaptor body may generally include a structure configured to hold or removably couple earpiece inserts within an earpiece housing. For example, an earpiece adaptor body (e.g., earpiece adaptor body 12) may include an upper surface (e.g., upper surface 14) and a lower surface (e.g., lower surface 16). In some implementations, earpiece adaptor body 12 may be formed of various materials (e.g., thermoplastic materials, elastomeric materials, plastics, polymers, and combinations thereof). As will be discussed in greater detail below, the exterior edges of the earpiece adaptor body 12 may be sized to fit within an earpiece housing. In some implementations, earpiece adaptor body 12 may be generally elliptical in shape, circular in shape, square in shape, combinations thereof, etc. Accordingly, it will be appreciated that earpiece adaptor body 12 may be defined in various shapes within the scope of the present disclosure.

Figure 4:
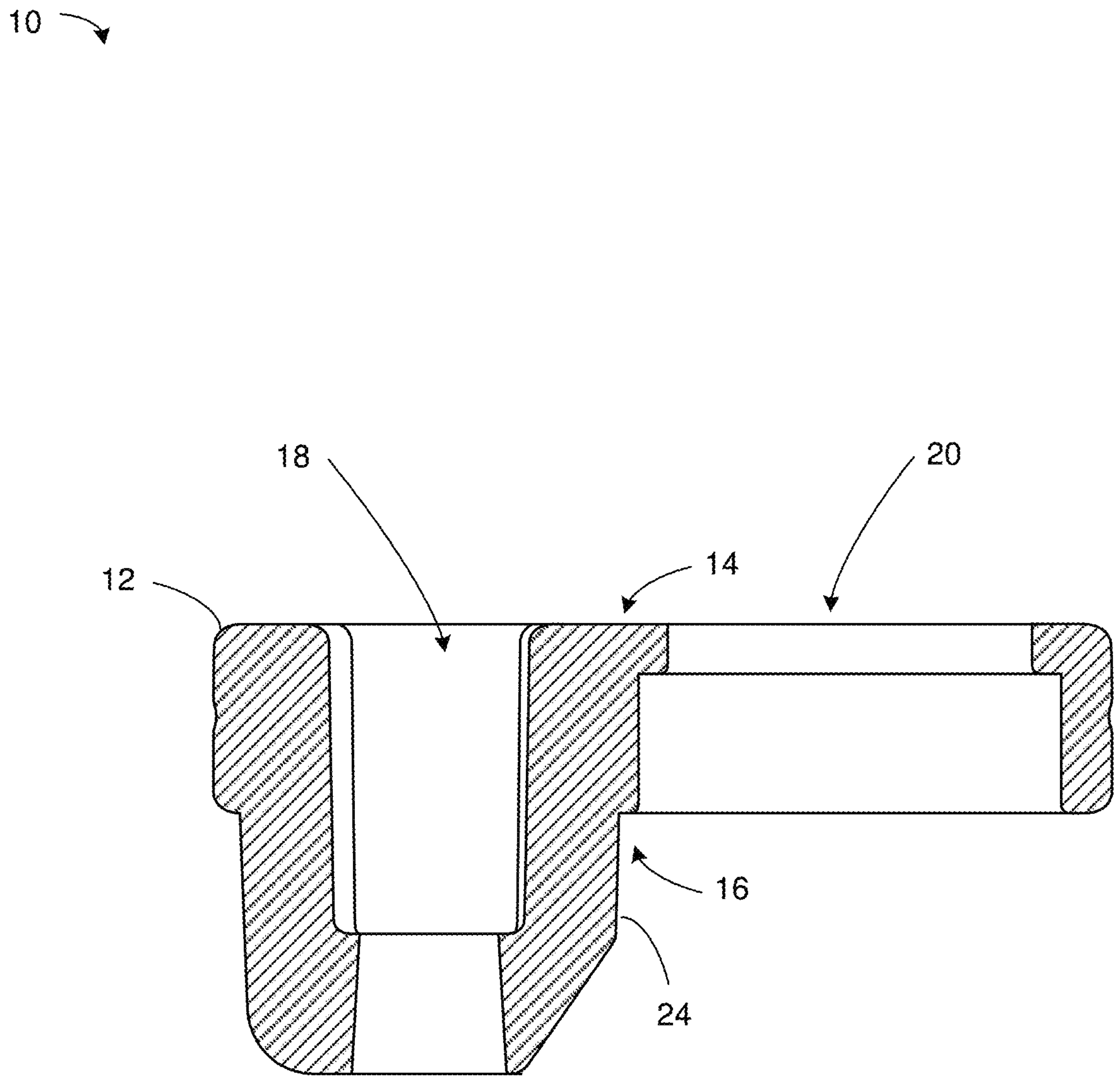
FIG. 4 is a cross-sectional view of the modular earpiece adaptor of FIG. 2, according to an example embodiment.

In some implementations, modular earpiece adaptor 10 may include one or more apertures within the earpiece adaptor body extending from the upper surface to the lower surface. Referring again to the example of FIG. 1 and in some implementations, modular earpiece adaptor 10 may include one or more apertures (e.g., first aperture 18 and second aperture 20) within earpiece adaptor body 12 extending from upper surface 14 to lower surface 16. Referring also to the example of FIG. 4 and in some implementations, a first aperture (e.g., first aperture 18) may extend from upper surface 14 through earpiece adaptor body 12 to lower surface 16. As shown in the example of FIG. 4, first aperture 18 and second aperture 20 may include various interior features (e.g., drafts, stages, steps, rims, edges, etc.). As will be discussed in greater detail below, the various interior features of each aperture may be configured for removably coupling an earpiece insert to earpiece adaptor body 12. In some implementations, the one or more apertures may be generally circular-shaped, square-shaped, triangular-shaped, shaped in combinations thereof, etc. within the scope of the present disclosure.

Figure 6:
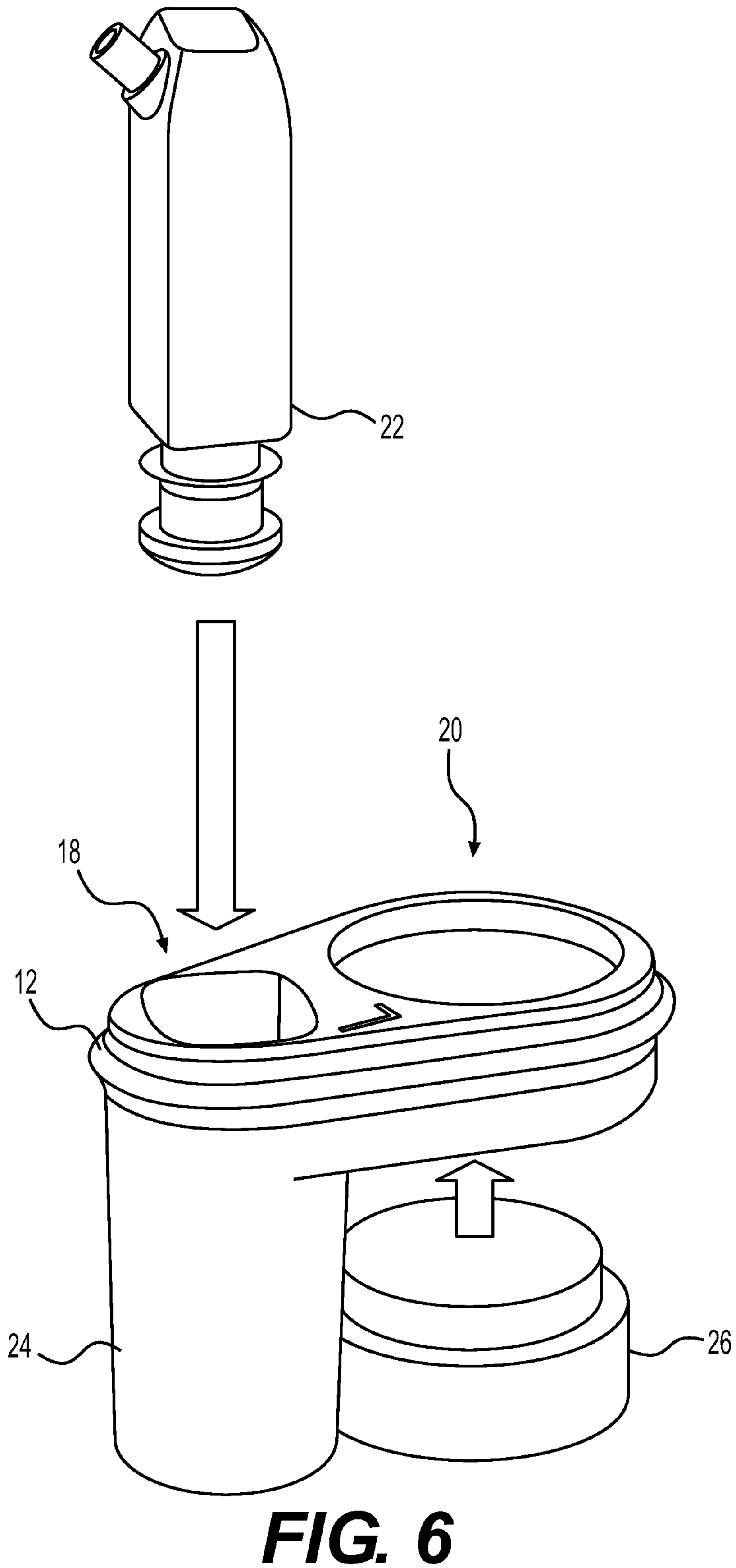
FIG. 6 is a diagrammatic view of a modular earpiece adaptor and various earpiece inserts, according to an example embodiment.

Referring also to the example of FIG. 6 and in some implementations, the one or more apertures may be configured to removably couple one or more earpiece inserts to the earpiece adaptor body. As discussed above and in some implementations, an earpiece insert may generally include an earpiece module or component configured to perform an operation within an earpiece housing (e.g., operations such as communication, filtering, etc.). Removably coupling may generally include coupling an earpiece insert to and/or within and/or partially within earpiece adaptor body 12. In some implementations, various features of each earpiece insert and/or within each aperture may correspond to couple the earpiece insert to and/or within and/or partially within the aperture. In some implementations, an elastomeric interior surface of each aperture and/or an elastomeric surface of each earpiece insert may couple the earpiece insert to earpiece adaptor body 12 via friction between the exterior edges of each earpiece insert and each aperture. In some implementations, the interior surface of each aperture may include various textures, surface patterns, etc. to removably couple an earpiece insert to and/or within and/or partially within an aperture.

In some implementations, removable coupling an earpiece insert to modular earpiece adaptor 10 may include inserting an earpiece insert into an aperture until exterior features of the insert interact with interior features of the aperture. Accordingly, it will be appreciated that an earpiece insert may be removably coupled to an aperture via various features, materials, etc. of the insert and/or the aperture within the scope of the present disclosure.

For example, at least one aperture (e.g., first aperture 18) may be configured to removably couple a communication insert (e.g., communication insert 22) to earpiece adaptor body 12. Communication insert 22 may generally include an earpiece insert configured for communication such as a speaker, a microphone, etc. As discussed above, first aperture 18 may be configured with interior features and/or materials to interact with exterior features and/or materials of communication insert 22 to removably couple communication insert 22 to earpiece adaptor body 12. In this manner, a user may insert communication insert 22 into a corresponding aperture (e.g., first aperture 18) of modular earpiece adaptor 10. As will be discussed in greater detail below, modular earpiece adaptor 10 may be sized to fit within or at least partially within an earpiece housing. In this manner, a user may utilize various communication inserts in a modular manner using various corresponding apertures in modular earpiece adaptor 10 without modifying the communication inserts.

In some implementations, communication insert 22 may include a portion of a tube configured to carry acoustic waves from a source. For example, communication insert 22 may include a terminal end of a tube configured to carry acoustic waves to a user's ear from a source. In this manner, portions of communications devices may be removably coupled to earpiece adaptor body 12.

In some implementations, at least one aperture (e.g., first aperture 18) may be configured to removably couple an audio insert to earpiece adaptor body 12. An audio insert may generally include an earpiece insert configured for providing audio signals to the ear of a user (e.g., a speaker, a portion of an audio receiver, etc.). As discussed above, first aperture 18 may be configured with interior features and/or materials to interact with exterior features and/or materials of the audio insert to removably couple the audio insert to earpiece adaptor body 12. In this manner, a user may insert an audio insert into a corresponding aperture (e.g., first aperture 18) of modular earpiece adaptor 10. While examples of a communication insert and an audio insert being removably couplable with a first aperture have been provided, it will be appreciated that communication inserts and audio inserts may be removably coupled via separate apertures and/or that the first aperture may be configured to removably couple any type of earpiece insert to an earpiece adaptor body.

In some implementations, the earpiece adaptor body may include an extension positioned on the lower surface and configured to at least partially house the communication insert. For example and as shown in FIG. 1, an extension (e.g., extension 24) may extend from lower surface 16 of earpiece adaptor body 12 and may be configured to at least partially house communication insert 22. In some implementations, extension 24 may be integrally formed with earpiece adaptor body 12 or coupled to lower surface 16 of earpiece adaptor body 12. In some implementations, first aperture 18 may extend at least partially through extension 24. As discussed above, first aperture 18 may include various internal features to interact with communication insert 22 and in some implementations, the portion of first aperture 18 extending through extension 24 may include these features. While reference has been made to a communication insert, it will be appreciated that extension 24 may be configured to at least partially house any earpiece insert (e.g., an audio insert, a filter insert, etc.).

In some implementations, at least one aperture of the one or more apertures may be configured to removably couple a filter insert to the earpiece adaptor body. For example, at least one aperture (e.g., second aperture 20) may be configured to removably couple a filter insert (e.g., filter insert 26) to earpiece adaptor body 12. A filter insert may generally include an earpiece insert configured to suppress certain frequency ranges and/or certain audio characteristics (e.g., an impulse function generated when discharging a firearm). In some implementation, filter inserts may generally include protection inserts. For example, protection insert may be configured to at least partially block or protect a user's ear or portions of a user's ear from harmful audio signals. As discussed above, second aperture 20 may be configured with interior features and/or materials to interact with exterior features and/or materials of filter insert 26 to removably couple filter insert 26 to and/or within and/or partially within earpiece adaptor body 12. In this manner, a user may insert filter insert 26 into a corresponding aperture (e.g., second aperture 20) of modular earpiece adaptor 10. As will be discussed in greater detail below, modular earpiece adaptor 10 may be sized to couple to an earpiece housing. In this manner, a user may utilize various filter inserts with a modular manner using various corresponding apertures in modular earpiece adaptor 10 without modifying the filter inserts themselves.

Accordingly and as shown in the example of FIGS. 1-4, modular earpiece adaptor 10 may include earpiece adaptor body 12, first aperture 18 within earpiece adaptor body 12 configured to removably couple a communication insert to earpiece adaptor body 12, and second aperture 20 within earpiece adaptor body 12 configured to removably couple a filter insert to earpiece adaptor body 12. While an example with two apertures has been provided for removably coupling two specific inserts (e.g., a communication insert and a filter insert), it will be appreciated that modular earpiece adaptor 10 may include any number of apertures and any combination of earpiece inserts for use with a modular earpiece.

Figure 5:
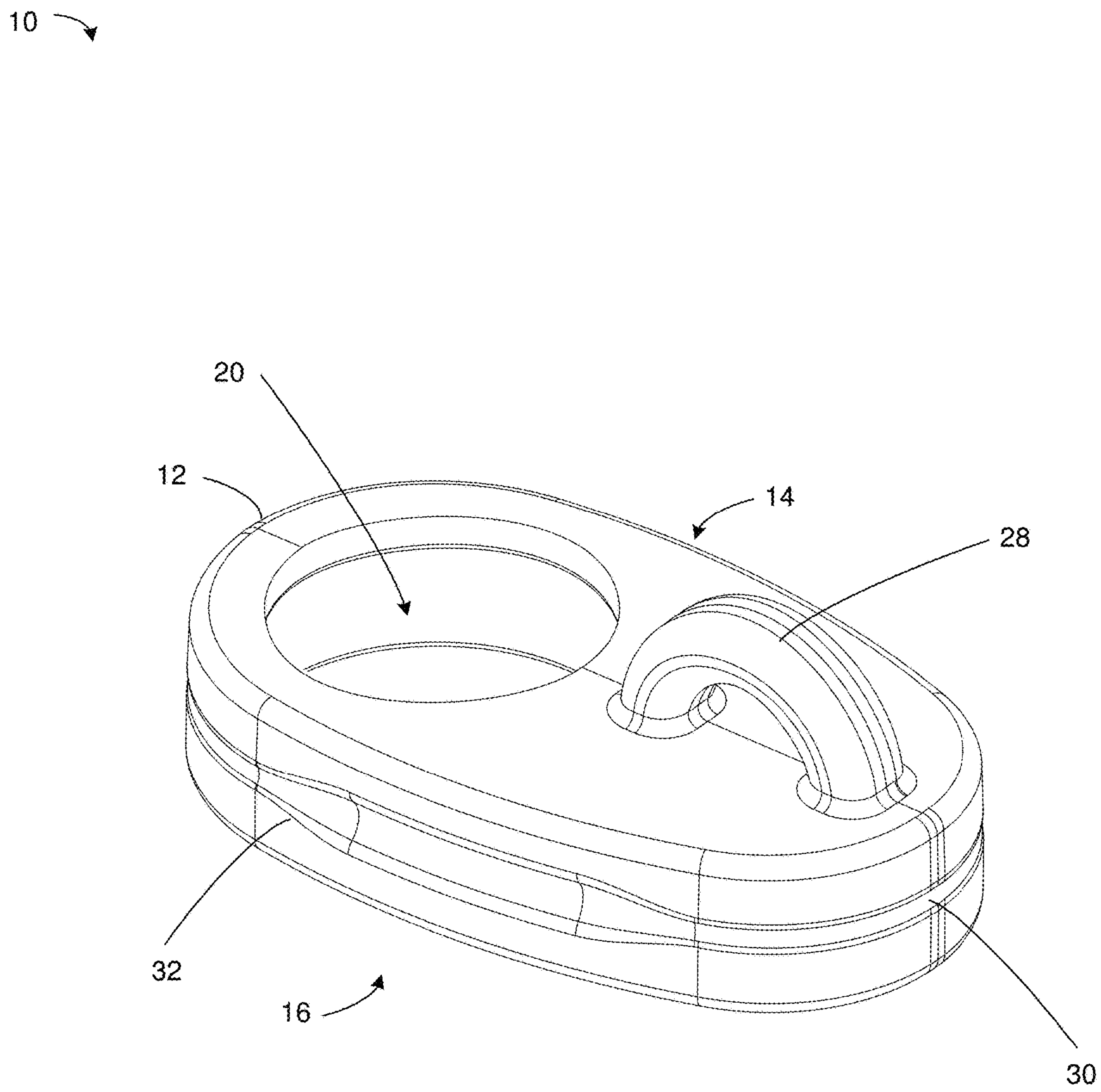
FIG. 5 is a perspective view of a modular earpiece adaptor, according to an example embodiment.

For example and in some implementations, modular earpiece adaptor 10 may include a single aperture. Referring also to the example of FIG. 5 and in some implementations, modular earpiece adaptor 10 may include a single aperture (e.g., aperture 20). In this example and as discussed above, aperture 20 may be configured or sized to removably couple various earpiece inserts (e.g., communication inserts, filter inserts, etc.). While an example of aperture 20 that is configured to removably couple a filter insert (e.g., filter insert 26) is shown in the example of FIG. 5, it will be appreciated that the single aperture may be configured for removably coupling any earpiece insert.

In some implementations, the earpiece adaptor body may include a handle positioned on the upper surface of the earpiece adaptor body. For example and as shown in FIG. 5, earpiece adaptor body 12 may include a handle (e.g., handle 28) positioned on upper surface 14 of earpiece adaptor body 12. In some implementations, handle 28 may allow for grasping and handling of modular earpiece adaptor 10 into and/or out of an earpiece housing. In some implementations, handle 28 may be positioned in any orientation on upper surface 14. As shown in FIG. 5, handle 28 may be positioned beginning with a first end positioned on a distal end of earpiece adaptor body 12 and a second end positioned proximate to the center of earpiece adaptor body 12. However, it will be appreciated handle 28 may be positioned e.g., with a first end on one side and a second end on the opposite side. In some implementations, handle 28 may be positioned between at least two apertures within earpiece adaptor body 12. In some implementations, handle 28 may be semi-circular, may include one or more loops, may be triangular (e.g., extend from two portions of earpiece adaptor body 12 and terminate at a common point), may be square-shaped, may be rectangular-shaped, etc.

In some implementations, the earpiece adaptor body may include a groove extending at least partially around the exterior of the earpiece adaptor body. For example and as shown in FIGS. 1 and 5, earpiece adaptor body 10 may include a groove or channel (e.g., groove 30) extending around the periphery of earpiece adaptor body 12. In some implementations, groove 30 may extend around at least a portion of earpiece adaptor body 12. For example, groove 30 may extend around only a portion of earpiece adaptor body 12. In some implementations, groove 30 may include various groove depths or surface patterns along the at least a portion of the periphery of earpiece adaptor body 12.

In some implementations, earpiece adaptor body 12 may include a plurality of distinct grooves or groove-types. For example, a first groove or groove-type (e.g., first groove 30) may extend around the periphery of adaptor body 12 and a second groove or groove-type (e.g., second groove 32) may extend around a portion of the periphery of adaptor body 12. In this example, second groove 32 may be larger than first groove 30. However, it will be appreciated that first groove 30 may be larger than second groove 32. In some implementations, first groove 30 may include one shape or style of pattern on the surface of earpiece adaptor body 12 while second groove 32 may include a second shape or style of pattern on the surface of earpiece adaptor body. Additionally, while an example of two grooves has been described, it will be appreciated that any number of grooves may be positioned across any portion(s) of the earpiece adaptor body be within the scope of the present disclosure.

Figure 7:
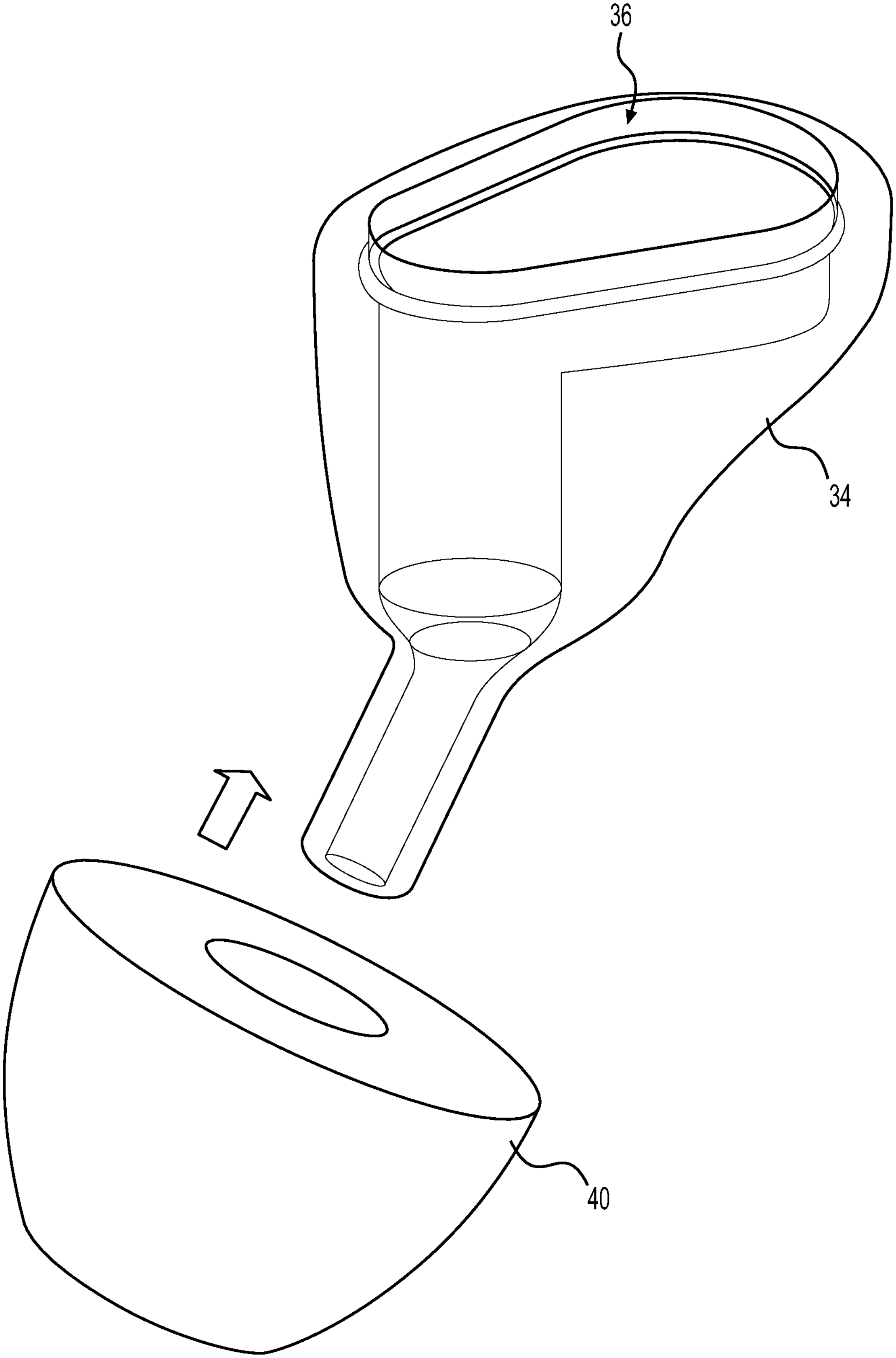
FIG. 7 is a diagrammatic view of an earpiece housing with an interchangeable tip, according to an example embodiment.
Figure 8:
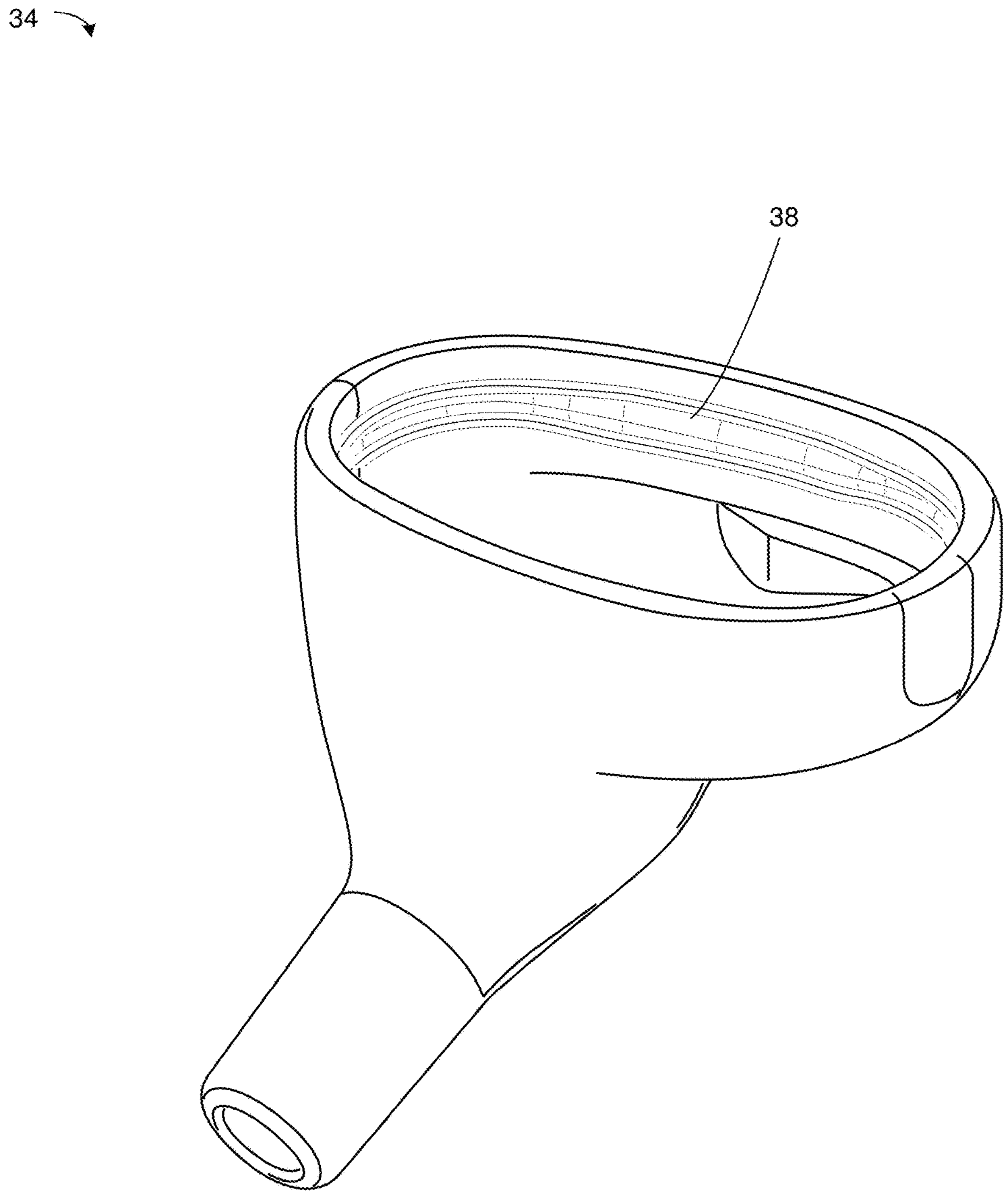
FIG. 8 is a cross-sectional view of an earpiece housing, according to an example embodiment.
Figure 9:
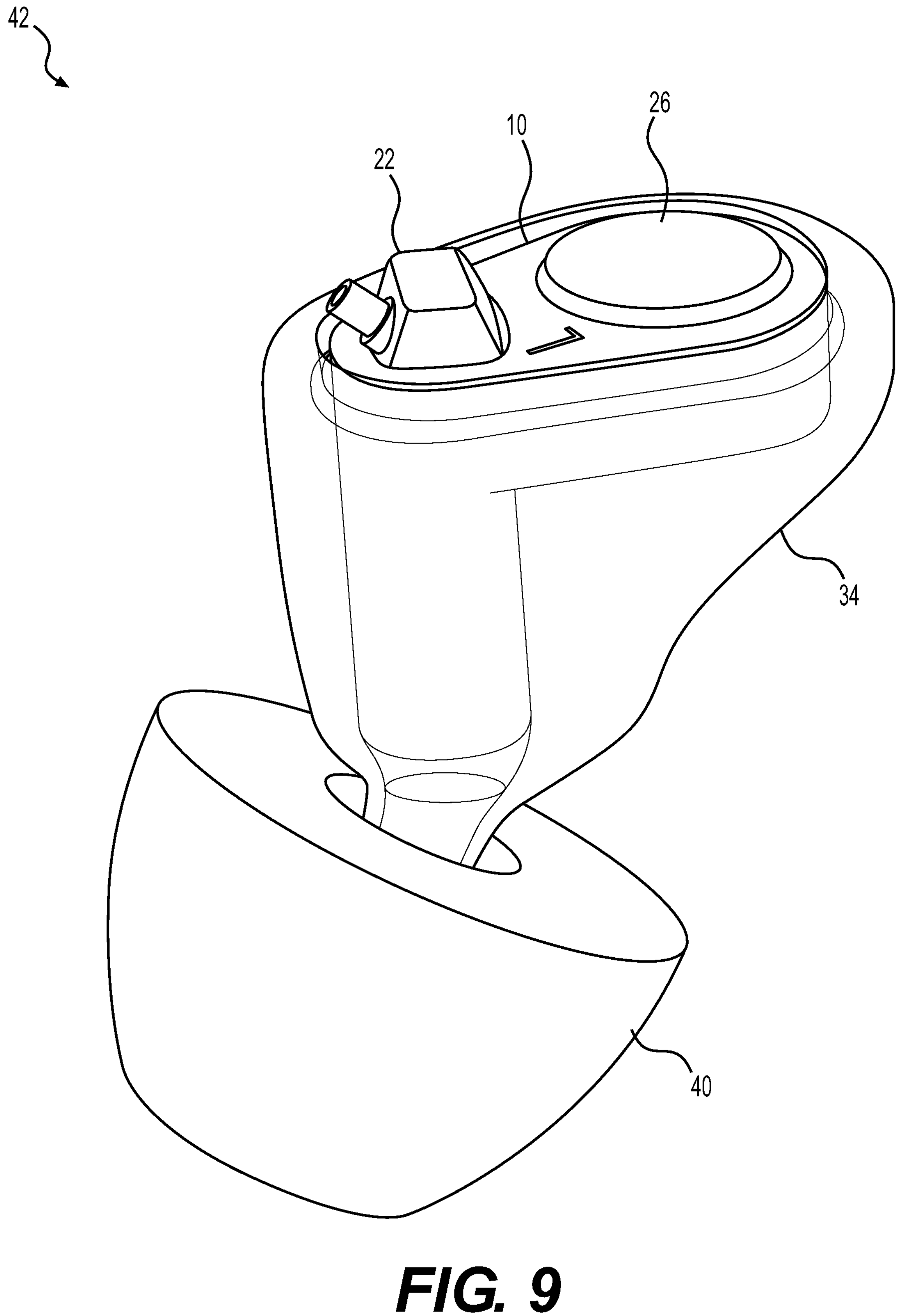
FIG. 9 is a diagrammatic view of a modular earpiece, according to an example embodiment.

In some implementations, the earpiece adaptor body may be configured to be removably couplable to an earpiece housing. In some implementations, a modular earpiece adaptor may be configured to be removably coupled to and/or within and/or at least partially within a modular housing. For example and as shown in FIGS. 7-8, an earpiece housing (e.g., earpiece housing 34) may include a cavity configured to receive and removably retain modular earpiece adaptor 10. In some implementations, earpiece housing 34 may include a connector assembly configured to removably couple earpiece adaptor body 12 to modular earpiece adaptor 34. For example and as will be discussed in greater detail below, lower surface 16 of earpiece adaptor body 12 may include one or more connectors configured to mate with one or more corresponding connectors of earpiece housing 34. In some implementations, earpiece housing 34 may include a tip portion extending from a lower portion of earpiece housing 34. In some implementations, the tip portion may be configured to at least partially extend toward or into a user's ear canal.

In some implementations, the earpiece adaptor body may be configured to be interchangeably couplable to a universal earpiece housing and a custom earpiece housing. For example, a universal earpiece housing may generally include a non-customized earpiece housing. As discussed above, the shape and fit of a universal modular earpiece may be generally usable by any user. However, such universal or standard earpiece housings may be uncomfortable and undesirable for long-term or frequent user. Accordingly, users may desire to use custom earpiece housings. In some implementations, universal modular earpiece and custom earpiece housing may each be configured to be removably couplable to a modular earpiece adaptor. For example, each universal modular earpiece and custom modular earpiece may be configured with a housing opening (e.g., housing opening 36) sized and shaped to removably couple modular earpiece adaptor 10 and/or accommodate at least a portion of modular earpiece adaptor 10.

In some implementations, the earpiece adaptor body may be configured to be removably coupled to the earpiece housing via the groove extending at least partially around the exterior of the earpiece adaptor body mating with a protruding lip extending at least partially around an interior rim of the earpiece housing. As discussed above and in some implementations, earpiece adaptor body 12 may include a groove (e.g., groove 30) extending at least partially around the exterior of earpiece adaptor body 12. In some implementations and as shown in the example of FIG. 8, earpiece housing 34 may include a protruding lip (e.g., protruding lip 38) extending at least partially around an interior rim of the earpiece housing. In some implementations, groove 30 of earpiece adaptor body 12 may be configured to mate or connect with corresponding protruding lip 38 when earpiece adaptor body 12 is inserted at least partially into earpiece housing 34. While an example of a groove extending around the exterior of earpiece adaptor body 10 and a protruding lip extending around an interior rim of modular housing 34 has been provided, it will be appreciated that other corresponding or mating features may be used to removably couple earpiece adaptor body 12 to and/or within and/or partially within earpiece housing 34. For example, earpiece housing 34 may include a groove extending around the interior rim of earpiece housing 34 and earpiece adaptor body 12 may include a protruding lip extending around an exterior of earpiece adaptor body 12. In another example, earpiece adaptor body 12 may include a first pattern of grooves and protrusions configured to mate with a second pattern of grooves and protrusions of earpiece housing 34. In some implementations, the corresponding pairs of grooves and protrusions may be semi-circular-shaped, square-shaped, triangular-shaped, rectangular-shaped, shaped in combinations thereof, etc. In one example, the combination of groove 30 and protruding lip 38 may be configured to form a snap-fit between earpiece adaptor body 12 and earpiece housing 34. However, it will be appreciated that other types of interlocking assemblies may be used to removably couple earpiece adaptor body 12 to earpiece housing 34 within the scope of the present disclosure.

In some implementations, an interchangeable tip may be configured to be removably coupled to the earpiece housing. Referring also to the examples of FIGS. 7 and 9 and in some implementations, an interchangeable tip (e.g., interchangeable tip 40) may be configured to be removably coupled to a tip portion of earpiece housing 34. In some implementations, interchangeable tip 40 may be formed of various materials configured to be partially inserted into and to gently expand within a portion of a user's ear canal (e.g., foam, plastic, etc.) to form a seal between interchangeable tip 40 and the user's ear canal.

Referring also to the example of FIG. 8 and in some implementations, a modular earpiece may include an earpiece housing and a modular earpiece adaptor configured to be removably coupled to the earpiece housing. For example, a modular earpiece (e.g., modular earpiece 42) may include earpiece housing 34 and modular earpiece adaptor 10. In some implementations, modular earpiece adaptor 10 may include communication insert 22 and/or filter insert 26.

Figure 10:
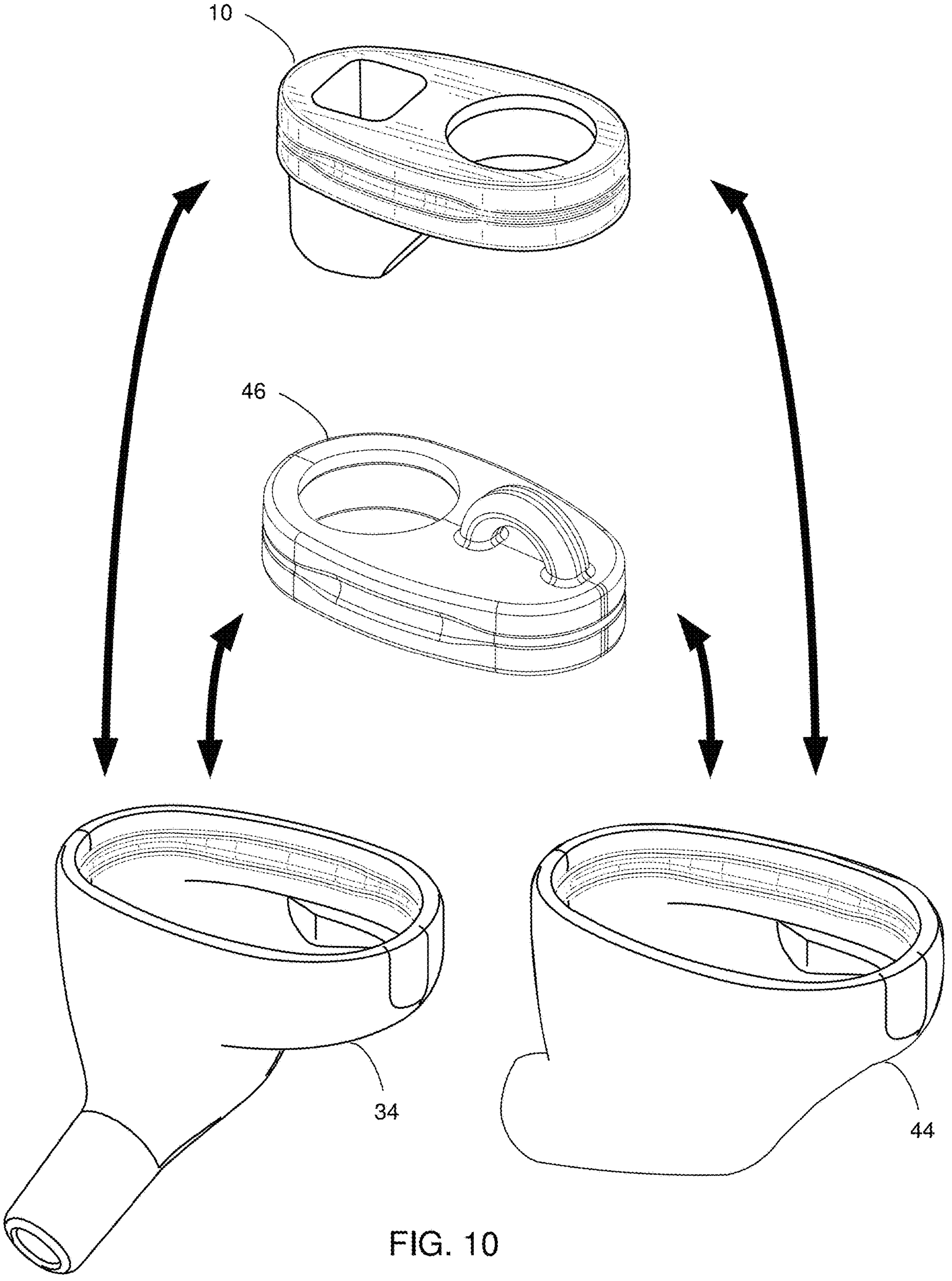
FIG. 10 is a diagrammatic view of various modular earpiece adaptors that may be interchangeably coupled to various earpiece housings.

Referring also to the example of FIG. 10 and as discussed above, modular earpiece adaptor 10 may allow various earpiece components or inserts (e.g., communication insert, filter insert, etc.) to be used interchangeably with various types of earpiece housings (e.g., universal earpiece housing, custom earpiece housing, etc.) without modifying the earpiece inserts for use with specific housings. For example, modular earpiece adaptor 10 may be configured to removably couple or retain an earpiece insert (e.g., a communication earpiece insert, an audio earpiece insert, a filter earpiece insert, etc.) to a universal earpiece housing (e.g., universal earpiece housing 34) and a custom earpiece housing (e.g., custom earpiece housing 44) without requiring earpiece inserts to be specially manufactured for use with the geometry of a particular earpiece housing. In this manner, various modular earpiece adaptors (e.g., modular earpiece adaptor 10 and modular earpiece adaptor 46) with various earpiece inserts may be interchangeably coupled to both universal and custom earpiece housings. As such, with a modular earpiece portion, earpieces may be used in a modular fashion with various earpiece inserts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A modular earpiece adaptor comprising:

an earpiece adaptor body having an upper surface and a lower surface, wherein at least a portion of the earpiece adaptor body includes a groove extending at least partially around a periphery of the at least the portion of the earpiece adaptor body; and one or more apertures within the earpiece adaptor body extending from the upper surface to the lower surface;

wherein the periphery of at least the portion of the earpiece adaptor body is configured to be received within a housing opening of an earpiece housing orienting the lower surface of the earpiece adaptor body into an interior of the earpiece housing toward a tip portion positioned on an opposite end of the earpiece housing relative to the housing opening and that extends at least partially into an ear canal; and wherein the groove extending at least partially around the periphery of the at least a portion of the earpiece adaptor body is configured to engage with a protruding lip extending at least partially around an interior rim of the housing opening of the earpiece housing.

2. The modular earpiece adaptor of claim 1, wherein the one or more apertures are configured to removably couple one or more earpiece inserts to the earpiece adaptor body.

3. The modular earpiece adaptor of claim 2, wherein at least one aperture of the one or more apertures is configured to removably couple one or more of a communication insert and an audio insert to the earpiece adaptor body.

4. The modular earpiece adaptor of claim 2, wherein at least one aperture of the one or more apertures is configured to removably couple a filter insert to the earpiece adaptor body.

5. The modular earpiece adaptor of claim 1, wherein the earpiece adaptor body includes a handle positioned on the upper surface of the earpiece adaptor body.

6. The modular earpiece adaptor of claim 1, wherein the earpiece adaptor body is configured to be interchangeably couplable to a universal earpiece housing and a custom earpiece housing.

7. A modular earpiece adaptor comprising:

an earpiece adaptor body configured to removably couple one or more earpiece inserts to the earpiece adaptor body, wherein at least a portion of the earpiece adaptor body includes a groove extending at least partially around a periphery of the at least the portion of the earpiece adaptor body;

wherein the periphery of the at least the portion of the earpiece adaptor body is configured to be received within a housing opening of an earpiece housing orienting a lower surface of the earpiece adaptor body into an interior of the earpiece housing toward a tip portion positioned on an opposite end of the earpiece housing relative to the housing opening and that extends at least partially into an ear canal, and wherein the groove extending at least partially around the periphery of the at least a portion of the earpiece adaptor body is configured to engage with a protruding lip extending at least partially around an interior rim of the housing opening of the earpiece housing.

8. The modular earpiece adaptor of claim 7, wherein the earpiece adaptor body is configured to be interchangeably couplable to a universal earpiece housing and a custom earpiece housing.

9. A modular earpiece comprising:

an earpiece housing including a housing opening and a tip portion positioned on an opposite end of the earpiece housing relative to the housing opening and that extends at least partially into an ear canal, wherein at least a portion of an earpiece adaptor body includes a groove extending at least partially around a periphery of the at least the portion of the earpiece adaptor body; and a modular earpiece adaptor configured to be at least partially received within the housing opening of the earpiece housing, wherein the modular earpiece adaptor includes:

the earpiece adaptor body having an upper surface and a lower surface;

a first aperture within the earpiece adaptor body extending from the upper surface to the lower surface and configured to removably couple one or more of a communication insert and an audio insert to the earpiece adaptor body; and a second aperture within the earpiece adaptor body extending from the upper surface to the lower surface and configured to removably couple a filter insert to the earpiece adaptor body, wherein the earpiece housing and the modular earpiece adaptor each include corresponding connectors configured to removably couple the modular earpiece adaptor within the housing opening of the earpiece housing; and wherein the groove extending at least partially around the periphery of the at least the portion of the earpiece adaptor body is configured to engage with a protruding lip extending at least partially around an interior rim of the housing opening of the earpiece housing.

10. The modular earpiece of claim 9, wherein the one or more apertures are configured to removably couple one or more earpiece inserts to the earpiece adaptor body.

11. The modular earpiece of claim 9, wherein the earpiece adaptor body includes a handle positioned on the upper surface of the earpiece adaptor body.

12. The modular earpiece of claim 9, wherein the earpiece housing is one of a universal earpiece housing and a custom earpiece housing.

13. The modular earpiece of claim 12, wherein the modular earpiece adaptor is configured to be interchangeably couplable to the universal earpiece housing and the custom earpiece housing.

* * * * *